(12) United States Patent
Kileen

(10) Patent No.: US 8,585,118 B2
(45) Date of Patent: Nov. 19, 2013

(54) INTEGRAL POWER TAILGATE AND WIPER ACTUATION IN A VEHICLE

(75) Inventor: David M. Kileen, Bloomfield Hills, MI (US)

(73) Assignee: GM Global Technology Operation LLC, Detroit, MI (US)

( * ) Notice: Subject to any disclaimer, the term of this patent is extended or adjusted under 35 U.S.C. 154(b) by 231 days.

(21) Appl. No.: 13/166,851

(22) Filed: Jun. 23, 2011

(65) Prior Publication Data

US 2012/0326464 A1 Dec. 27, 2012

(51) Int. Cl.
*B60S 1/06* (2006.01)
(52) U.S. Cl.
USPC ............ 296/96.17; 296/96.15; 15/250.3
(58) Field of Classification Search
USPC ............ 296/146.8, 146.4, 96.15, 96.17; 15/250.3, 250.31
See application file for complete search history.

(56) References Cited

U.S. PATENT DOCUMENTS 6,196,617 B1 * 3/2001 Beck .................. 296/146.11
7,290,306 B2 * 11/2007 Wagner .................. 15/250.3

\* cited by examiner

*Primary Examiner* — Joseph Pape
(74) *Attorney, Agent, or Firm* — Quinn Law Group, PLLC

(57) ABSTRACT

An actuating system is provided for a vehicle having a body characterized by a front portion and a rear portion, wherein the rear portion defines an access opening. The system includes a tailgate arranged to selectively open and close to thereby respectively cover and uncover at least a portion of the access opening. The system also includes an actuator configured to selectively open and close the tailgate, and a window operatively connected to the tailgate and having an exterior surface. The system additionally includes a window wiper operatively connected to the tailgate and configured to wipe at least a portion of the exterior surface of the window. Furthermore, the system includes a motor mounted on the tailgate and configured to selectively operate the actuator and the window wiper. A vehicle employing such a system is also provided.

15 Claims, 4 Drawing Sheets

ABOUT US 8,585,118 B2

INTEGRAL POWER TAILGATE AND WIPER ACTUATION IN A VEHICLE

TECHNICAL FIELD

The invention relates to integral power tailgate and wiper actuation in a vehicle.

BACKGROUND

Vehicles that have the capacity to transport substantial amounts of cargo have experienced consistent consumer demand. Such vehicles typically have a relatively large body opening so that objects which would not fit through the traditional door openings could be loaded into the cargo area. The cargo opening is frequently positioned in the aft-end of the vehicle body, and in many cases the closure design comprises a hinged door or tailgate for convenient access.

Typically, such a tailgate includes a window to facilitate a view for the vehicle's occupants to the rear of the vehicle. Frequently, the tailgate also incorporates a wiper for maintaining the occupants' rear view through the window.

The tailgate may be hinged for pivotable movement along the aft-end of the subject vehicle's roof or at the aft-end of the vehicle's body sides. Such pivotable attachment of the tailgate to the body of the vehicle permits the tailgate to swing up and/or away for loading or unloading cargo. The tailgate may include a drive mechanism for selectively swinging the tailgate up and/or away from or toward the access opening. The drive mechanism may be actuated by a tailgate mounted device or by a remote controller to either gain or restrict access to the interior of the vehicle.

SUMMARY

An actuating system is provided for a vehicle having a body characterized by a front portion and a rear portion, wherein the rear portion defines an access opening. The system includes a tailgate arranged to selectively open and close to thereby respectively cover and uncover at least a portion of the access opening. The system also includes an actuator configured to selectively open and close the tailgate, and a window operatively connected to the tailgate and having an exterior surface. The system additionally includes a window wiper operatively connected to the tailgate and configured to wipe at least a portion of the exterior surface of the window. Furthermore, the system includes a motor mounted on the tailgate and configured to selectively operate the actuator and the window wiper.

The system may also include a clutch operatively connected to each of the motor, the window wiper, and the actuator. In such a case, the clutch is configured to selectively couple the motor to the window wiper in a first mode of operation and to the actuator in a second mode of operation.

The clutch may be regulated to couple the motor to the window wiper in the first mode of operation via a first control device, and be regulated to couple the motor to the actuator in the second mode of operation via a second control device.

The clutch may employ a shape memory alloy (SMA) material selectively energized to operate the motor in one of the first and second modes. The clutch may be connected to the actuator via a torque transmitting cable.

The actuator may include a first actuator and a second actuator, wherein each of the first and second actuators is configured as a spindle drive.

The tailgate may be hinged to the rear portion of the vehicle body for substantially vertical pivotable movement and may thus be configured as a liftgate. Additionally, the tailgate may be hinged to the rear portion of the vehicle body for substantially horizontal pivotable movement and may thus be configured as a swing-out door.

A vehicle employing such a system is also provided.

The above features and advantages and other features and advantages of the present invention are readily apparent from the following detailed description of the best modes for carrying out the invention when taken in connection with the accompanying drawings.

DETAILED DESCRIPTION

Figure 1:
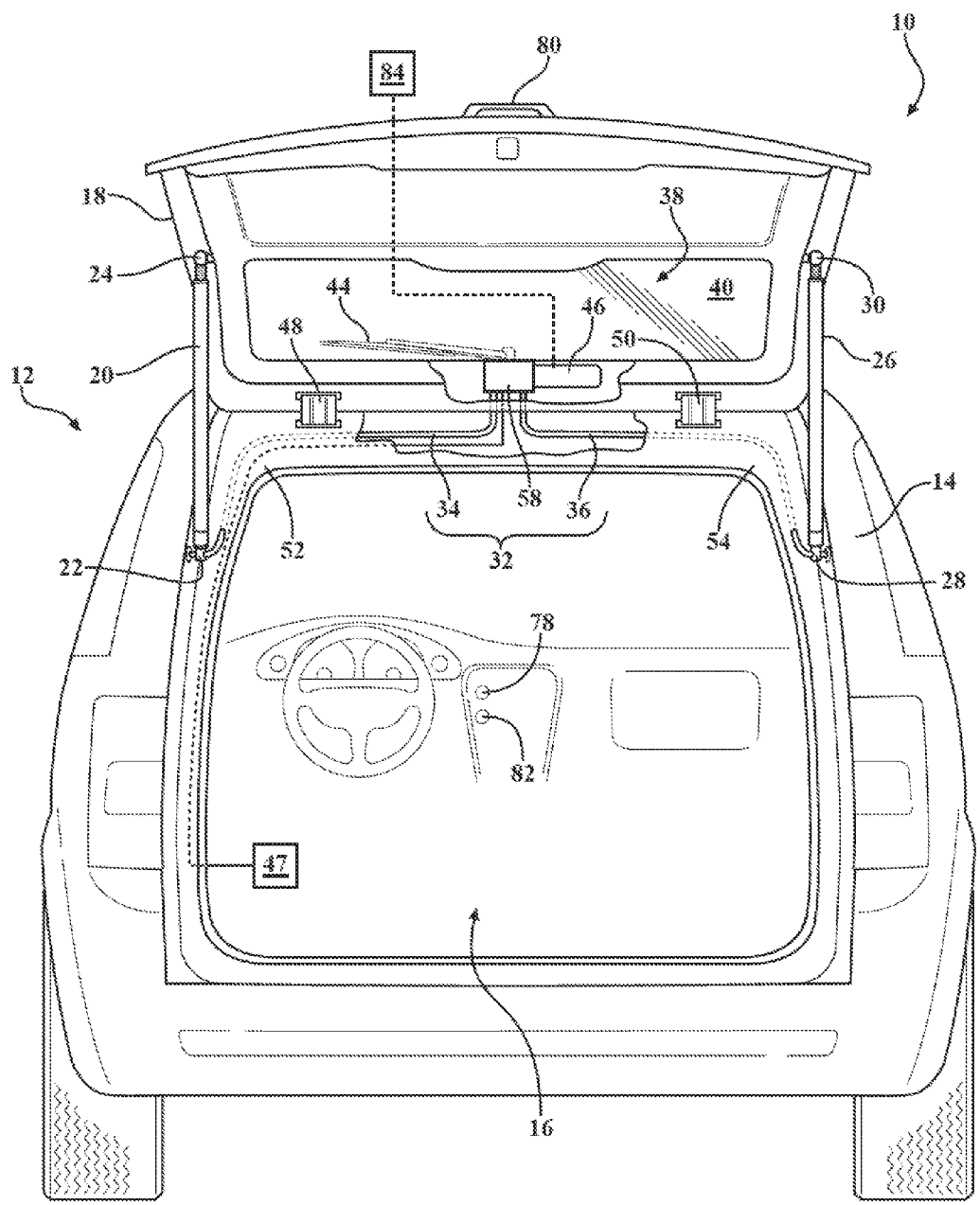
FIG. 1 is an illustration of an actuating system in a vehicle having a tailgate configured as a liftgate, illustrating the liftgate in an open state.

Referring to the drawings, wherein like reference numbers refer to like components, FIG. 1 shows an actuating system 10 included in a vehicle body 12. The vehicle body 12 encloses an interior space that is adapted to accommodate vehicle passengers and their belongings. As shown, the vehicle body 12 includes a rear portion 14 that defines an access opening 16. Besides the rear portion 14, the vehicle body 12 also includes a front portion, the existence of which, although not shown, will be appreciated by those skilled in the art.

The vehicle body 12 also includes a tailgate 18. The tailgate 18 is power operated to selectively open and close, to thereby respectively cover and uncover the access opening 16 and selectively permit and restrict access to the vehicle's interior space. The tailgate 18 is of the type that is frequently used for access to the interiors and storage compartments in vans, station wagons, and sport utility vehicles (SUVs).

The actuating system 10 includes a first actuator 20 and a second actuator 26. The first actuator 20 and the second actuator 26 operatively connect the tailgate 18 to the vehicle body 12. The first actuator 20 is operatively connected to the vehicle body 12 via a first end 22, and to the tailgate via a second end 24. Similarly, the second actuator 26 is operatively connected to the vehicle body 12 via a first end 28, and to the tailgate via a second end 30. As shown, the first and second actuators 20, 26 are each configured as a spindle drive that utilizes a lead screw to translate radial motion into linear motion. Accordingly, the first actuator 20 and the second actuator 26 are each configured to selectively open and close the tailgate 18. In place of the described spindle drive, other devices that are capable of translating radial motion into linear motion, such as a rack and pinion, may also be employed for the first and second actuators 20, 26.

The system 10 additionally includes a flexible drive system 32 configured to operate substantially simultaneously the first and second actuators 20, 26. The flexible drive system 32 includes a first flexible drive element 34 configured to operate the first actuator 20 and a second flexible drive element 36 configured to operate the second actuator 26. The first flexible drive element 34 is operatively connected to the first end 22 of the first actuator 20, while the second flexible drive element 36 is operatively connected to the first end 28 of the second actuator 26. Accordingly, the first and second flexible drive elements 34, 36 are configured to transmit actuating torque to the first and second actuators 20, 26, respectively.

The flexible drive elements 34, 36 may be produced from any suitable material, such as a flat-wrap cable conduit that is capable of withstanding torsional loads that the flexible drive elements are likely to see during operation of system 10. Although, as shown, the flexible drive system 32 operatively connects to the first and second actuators 20, 26 at their respective first ends 22 and 28, nothing precludes the flexible drive system from operating the first and second actuators by connecting to their respective second ends 24 and 30. In such a case, the internal mechanism of the first and second actuators 20, 26 would be reversed, such that the second ends 24, 30 could be driven by the flexible drive system 32.

Figure 2:
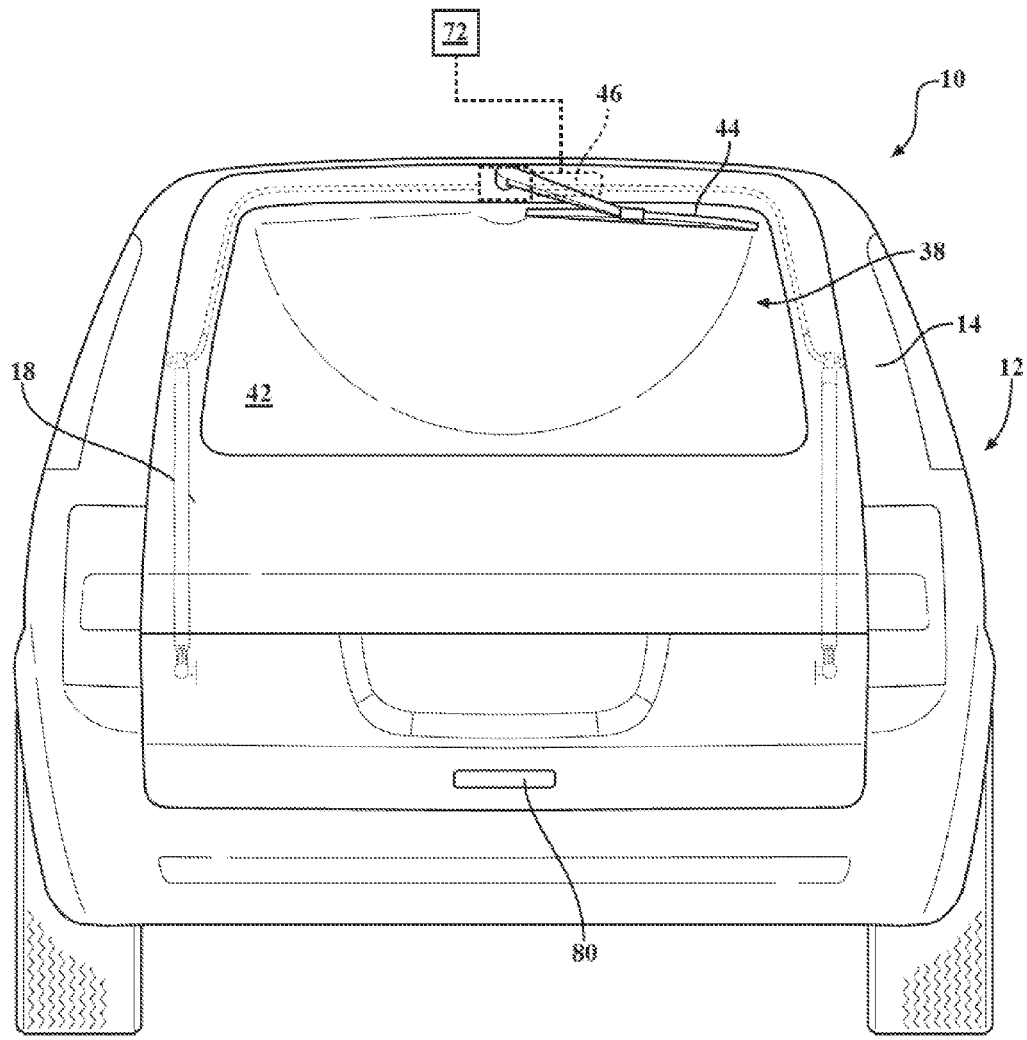
FIG. 2 is a view of the system shown in FIG. 1, illustrating the liftgate in a closed state.

The tailgate 18 includes a window 38, which may be seen in both FIGS. 1 and 2, wherein FIG. 1 shows the tailgate in an open state and FIG. 2 shows the tailgate in a closed state. The window 38 is operatively connected to the tailgate 18 and has an interior surface 40, which may be seen in FIG. 1, and an exterior surface 42, which may be seen in FIG. 2. The interior surface 40 of the window 38 forms a part of the vehicle's interior, while the exterior surface 40 of the window forms a part of the exterior of the tailgate 18. The window 38 may be fixed with respect to the tailgate 18, be configured to pivot with respect to the tailgate 18, or be selectively raised and lowered.

A window wiper 44 is operatively connected to the tailgate 18 and is configured to wipe or sweep at least a portion of the exterior surface 40. A motor 46 is mounted on the tailgate 18, and is configured to selectively operate the window wiper 44 and the first and second actuators 20, 26 via the flexible drive system 32. The motor 46 is electrically connected to and receives power from an energy source 47, such as a battery or a generator. The motor 46 may be configured to primarily operate the window wiper 44 and, on demand, be coupled to operate the first and second actuators 20, 26. Alternatively, the motor 46 may be configured to operate the window wiper 44 and the first and second actuators 20, 26 selectively, without having a primary torque transmitting path. Accordingly, the first and second flexible drive elements 34, 36 are configured to transmit torque from the motor 46 to the first and second actuators 20, 26, respectively, to selectively open and close the tailgate 18. The motor 46 is coupled to the window wiper 44 and to the first and second actuators 20, 26 via a clutch, which will be described in greater detail below, thus permitting the single motor 46 to operate the window wiper, as well as the first and second actuators.

As shown in FIG. 1, the tailgate 18 is hinged to the rear portion 14 of the vehicle body 12 via hinges 48, 50 for substantially vertical pivotable movement and is configured as a liftgate. The hinges 48, 50 are positioned proximately to the upper corners 52, 54 of the access opening 16. Consequently, the hinge 48 is located between the motor 46 and the first end 22 of the first actuator 20. Additionally, the hinge 50 is located between the motor 46 and the first end 28 of the second actuator 26. The flexible nature of the drive elements 34, 36 permits the flexible drive elements to be bent or flexed in order to pass around tailgate hinges 48, 50, and around corners 52, 54 that are otherwise arranged in the path between the motor 46 and the first ends 22, 28. The flexible drive elements 34, 36 may be similarly routed around other structures that would otherwise be positioned in the path of torque transmission between the motor 46 and the first ends 22, 28. Furthermore, the flexible nature of the drive elements 34, 36 permits the motor 46 to be mounted on entirely dissimilar plane relative to the first ends 22 and 28.

A first actuator 20 and a second actuator 26 are employed to selectively open and close the tailgate 18. Each of the first actuator 20 and the second actuator 26 operatively connects the tailgate 18 to the vehicle body 12. The first actuator 20 is operatively connected to the vehicle body 12 via a first end 22, and to the tailgate via a second end 24. Similarly, the second actuator 26 is operatively connected to the vehicle body 12 via a first end 28, and to the tailgate via a second end 30. As described with respect to FIG. 1, the first and second actuators 20, 26 are each configured to selectively open and close the tailgate 18.

Figure 3:
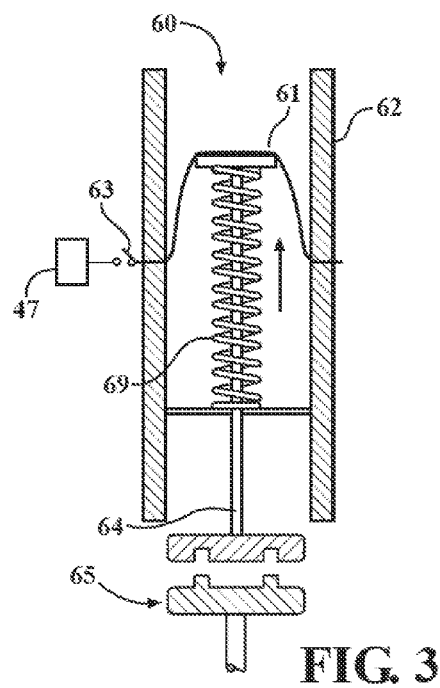
FIG. 3 is an exemplary schematic cross-sectional view of an actuator as employed in a clutch used with a window regulator motor for selectively operating the actuator and the window wiper, the clutch shown in a non-energized state.
Figure 4:
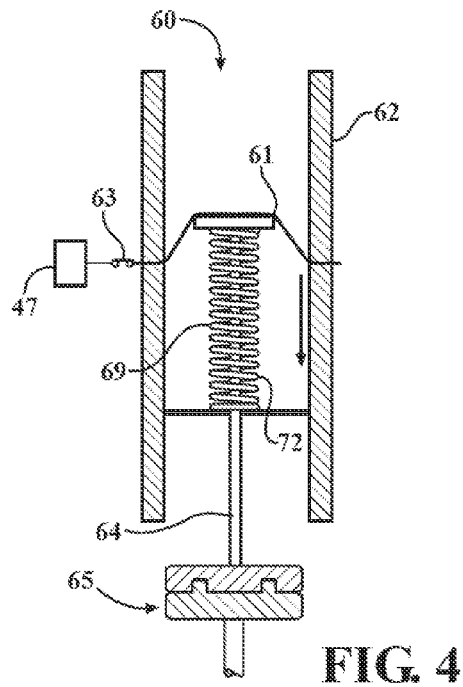
FIG. 4 is an exemplary schematic cross-sectional view of the actuator of FIG. 3 shown in an energized state.
Figure 5:
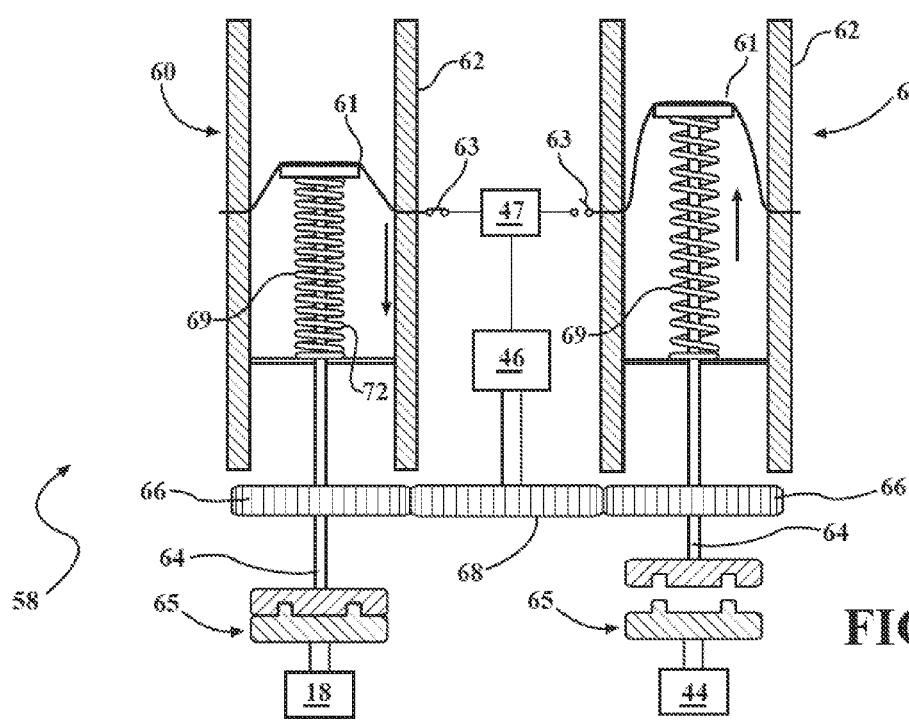
FIG. 5 is an exemplary schematic cross-sectional view of the clutch having two actuators of the type shown in FIGS. 3-4.

For the purpose of coupling the motor 46 to the first and second actuators 20, 26, the system 10 additionally includes a clutch 58. As seen in FIG. 1, the clutch 58 is operatively connected to each of the motor 46, to the window wiper 44 and to the first and second actuators 20, 26 via the flexible drive system 32. The clutch 58 is configured to selectively couple the motor 46 to the window wiper 44 in a first mode of operation and to the first and second actuators 20, 26 in a second mode of operation. When the motor 46 generates torque in the first mode, such torque is employed to operate the wiper 44 to typically clear any moisture and/or grime from the window 38. On the other hand, when the motor 46 generates torque in the second mode, such torque is employed to substantially simultaneously rotate the first flexible drive element 34 to drive the first end 22 of the first actuator 20 and the second flexible drive element 36 to drive the first end 28 of the second actuator 26 to selectively open and close the tailgate 18. Hence, the torque to operate each of the window wiper 44 and the tailgate 18 is generated by the same, single motor 46. As such, the motor 46 is enabled via the clutch 58 to actuate the window wiper 44 and selectively open and close the tailgate 18. The operation of clutch 58 may be regulated by a signal that is sent either from outside or from the interior of the vehicle. An exemplary configuration of clutch 58 is depicted in FIGS. 3-5, where the clutch is shown as having one actuator 60 for operating each of the window wiper 44 and the tailgate 18. As shown in FIGS. 3-5, each actuator 60 employs an active material member 61.

As shown in FIGS. 3-4, the active material member 61 may be configured as a continuous wire of constant cross-section from a shape memory alloy (SMA) that is secured inside a housing 62 of a single actuator 60. The active material member 61 may be selectively energized via an electrical current provided by the energy source 47 through a switch 63. As shown in FIG. 3, when active material member 61 is in its original shape, a shaft 64 operatively connected to a coupling device such as a dog clutch 65 is in a starting position and the dog clutch is disengaged. Active material member 61 is configured to undergo a shape change and thus translate a shaft 64 to engage dog clutch 65 when the active material member is subjected to the electrical current, as shown in FIG. 4. Active material member 61 regains its original shape when the current is taken away, and a biasing spring 69 pulls shaft 64 back to the starting position and disengages dog clutch 65.

As shown in FIG. 5, two separate actuators 60 may be combined to form clutch 58, be operatively connected to the motor 46, and be used to separately drive the first and second actuators 20, 26. As shown, each of the two such actuators 60 is selectively energized via energy source 47 through a separate switch 63 whose closure is regulated by a signal to the motor 46 from an appropriate controller or other actuating device. Additionally, each of the two such actuators 60 is connected to the motor 46 via a separate idler gear 66, wherein the separate idler gears 66 may have identical tooth counts and diameters or be dissimilar in that regard.

The motor 46 is operatively connected to a gear 68. Accordingly, each idler gear 66 is driven by the motor 46 via the gear 68. Thus, when the active material member 61 of one of the two actuators 60 is energized, that particular active material member engages one dog clutch 65 to operate the window wiper 44. Similarly, when active material member 61 of the other of the two actuators 60 is energized, that active material member engages the other dog clutch 65 to selectively open and close the tailgate 18. Although the clutch 58 is depicted as having multiple actuators 60 with active material members 61, any appropriate mechanism for operating the window wiper 44 and/or the tailgate 18 by the motor 46, such as a single or a plurality of electromechanical solenoids, may be used.

Figure 6:
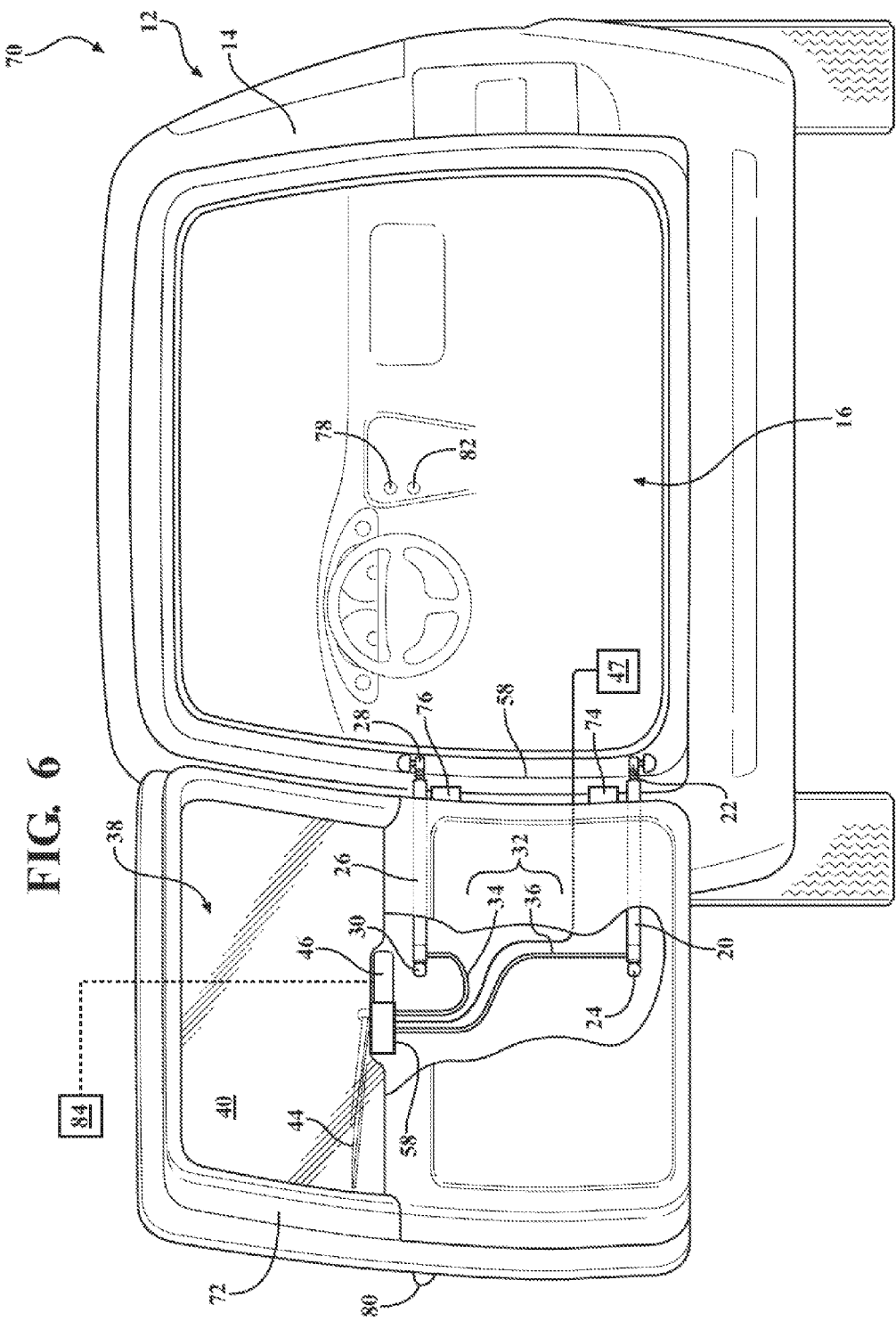
FIG. 6 is a view of the actuating system in a vehicle having a tailgate configured as a swing-out door that is illustrated in an open state.

FIG. 6 illustrates an actuating system 70 that includes a tailgate 72. The actuating system 70 operates identically to the system 10 described with respect to FIGS. 1-2, except that the tailgate 72 is configured as a swing-out door. The tailgate 72 is hinged to the rear portion 14 of the vehicle body via hinges 74, 76 for substantially horizontal pivotable movement relative to the vehicle body 12. The first actuator 20 and the second actuator 26 are employed to selectively open and close the tailgate 72. The first actuator 20 and the second actuator 26 operatively connect the tailgate 72 to the vehicle body 12. The first actuator 20 is operatively connected to the vehicle body 12 via the first end 22, and to the tailgate via the second end 24. Similarly, the second actuator 26 is operatively connected to the vehicle body 12 via the first end 28, and to the tailgate 72 via the second end 30. As described with respect to FIG. 1, the first and second actuators 20, 26 are each configured to selectively open and close the tailgate 18.

Similar to the tailgate 18, the tailgate 72 includes the window 38. The window 38 is operatively connected to the tailgate 72. The window wiper 44 is operatively connected to the tailgate 72 and is configured to wipe or sweep at least a portion of the exterior surface 42 of the window 38. The motor 46 is mounted on the tailgate 72, and, identically to its operation with respect to the system 10, is configured to selectively operate the window wiper 44 and the tailgate 72. Although in each of the systems 10 and 70, the motor 46 and the clutch 58 are shown as positioned on the tailgate 18, nothing precludes the motor and the clutch from being positioned on the rear portion 14 of the vehicle body proximate to the access opening 16. Such alternate positioning of the motor 46 and the clutch 58 would nonetheless retain all the operative connections and functionality described above.

In each of the systems 10 and 70, the clutch 58 may be regulated to couple the motor 46 to the window wiper 44 in the first mode of operation via a first control device 78 operatively connected to the tailgate 18, such as a button positioned in the interior of the vehicle (as shown in FIGS. 1 and 6). The clutch 58 may also be regulated to couple the motor 46 to the first and second actuators 20, 26 in the second mode of operation via a second control device. The contemplated second control device may be a lever 80 located on the tailgate, as shown in FIGS. 1, 2, and 6. Also, the second control device may be at least one of a button 82 positioned in the interior of the vehicle and a remote controller 84, such as a hand-held transmitter for generating an actuating signal, as shown in FIGS. 1 and 6.

While the best modes for carrying out the invention have been described in detail, those familiar with the art to which this invention relates will recognize various alternative designs and embodiments for practicing the invention within the scope of the appended claims.

The invention claimed is:

1. An actuating system for a vehicle having a body characterized by a front portion and a rear portion, wherein the rear portion defines an access opening, the system comprising:
    a tailgate arranged to selectively open and close to thereby respectively cover and uncover at least a portion of the access opening;
    an actuator configured to selectively open and close the tailgate;
    a window operatively connected to the tailgate and having an exterior surface;
    a window wiper operatively connected to the tailgate and configured to wipe at least a portion of the exterior surface of the window;
    a motor mounted on the tailgate and configured to selectively operate the actuator and the window wiper; and
    a clutch operatively connected to each of the motor, the window wiper, and the actuator, wherein the clutch is configured to selectively couple the motor to the window wiper in a first mode of operation and to the actuator in a second mode of operation;
    wherein the clutch employs a shape memory alloy material that is selectively energized to operate the motor in one of the first and second modes.

2. The system of claim 1, wherein the clutch is regulated to couple the motor to the window wiper in the first mode of operation via a first control device and is regulated to couple the motor to the actuator in the second mode of operation via a second control device.

3. The system of claim 1, wherein the clutch is connected to the actuator via a torque transmitting cable.

4. The system of claim 1, wherein the actuator includes a first actuator and a second actuator.

5. The system of claim 4, wherein each of the first and second actuators is configured as a spindle drive.

6. The system of claim 1, wherein the tailgate is hinged to the rear portion of the vehicle body for substantially vertical pivotable movement and is configured as a liftgate.

7. The system of claim 1, wherein the tailgate is hinged to the rear portion of the vehicle body for substantially horizontal pivotable movement and is configured as a swing-out door.

8. A vehicle comprising:
    a vehicle body characterized by a front portion and a rear portion, wherein the rear portion defines an access opening;
    a tailgate arranged to selectively open and close to thereby respectively cover and uncover at least a portion of the access opening; and
    an actuating system including:
        an actuator configured to selectively open and close the tailgate;
        a window operatively connected to the tailgate and having an exterior surface;
        a window wiper operatively connected to the tailgate and configured to wipe at least a portion of the exterior surface of the window;
        a motor mounted on the tailgate and configured to selectively operate the actuator and the window wiper; and
        a clutch operatively connected to each of the motor, the window wiper, and the actuator, wherein the clutch is configured to selectively couple the motor to the window wiper in a first mode of operation and to the actuator in a second mode of operation;

wherein the clutch employs a shape memory alloy material that is selectively energized to operate the motor in one of the first and second modes.

9. The vehicle of claim 8, wherein the clutch is regulated to couple the motor to the window wiper in the first mode of operation via a first control device and is regulated to couple the motor to the actuator in the second mode of operation via a second control device.

10. The vehicle of claim 8, wherein the clutch is connected to the actuator via a torque transmitting cable.

11. The vehicle of claim 8, wherein the actuator includes a first actuator and a second actuator.

12. The vehicle of claim 11, wherein each of the first and second actuators is configured as a spindle drive.

13. The vehicle of claim 8, wherein the tailgate is hinged to the rear portion of the vehicle body for substantially vertical pivotable movement and is configured as a liftgate.

14. The vehicle of claim 8, wherein the tailgate is hinged to the rear portion of the vehicle body for substantially horizontal pivotable movement and is configured as a swing-out door.

15. An actuating system for a vehicle having a body characterized by a front portion and a rear portion, wherein the rear portion defines an access opening, the system comprising:

a tailgate arranged to selectively open and close to thereby respectively cover and uncover at least a portion of the access opening;

an actuator configured to selectively open and close the tailgate;

a window operatively connected to the tailgate and having an exterior surface;

a window wiper operatively connected to the tailgate and configured to wipe at least a portion of the exterior surface of the window;

a motor mounted on the tailgate and configured to selectively operate the actuator and the window wiper; and a clutch operatively connected to each of the motor, the window wiper, and the actuator;

wherein the clutch is configured to selectively couple the motor to the window wiper in a first mode of operation and to the actuator in a second mode of operation, and the clutch employs a shape memory alloy material that is selectively energized to operate the motor in one of the first and second modes; and wherein the actuator is configured as a first spindle drive and a second spindle drive, and wherein the clutch is connected to each of the first and second spindle drives via a torque transmitting cable.

* * * * *